United States Patent Office 2,785,996
Patented Mar. 19, 1957

2,785,996

COMPOSITIONS AND METHOD OF TREATING TEXTILE MATERIALS

Bernard H. Kress, Ambler, Pa., assignor to Quaker Chemical Products Corporation, Conshohocken, Pa., a corporation of Pennsylvania No Drawing. Application January 24, 1955,
Serial No. 483,836

32 Claims. (Cl. 117—139.4)

This invention relates to compositions of matter which impart crease-proofing or crease recovery and/or dimensional stability to textile materials. In particular this invention is of special applicability for the treatment of regenerated cellulose such as viscose or cuprammonium products.

The compositions utilized in my invention include dialdehydes and a pentaerythritol, including pentaerythritol itself, dipentaerythritol, tripentaerythritol, and higher pentaerythritols, and also simple derivatives thereof. Under appropriate conditions of heat and catalysis, polymers are produced from these components which I believe to be polyacetals. When formed within the fiber these condensation products impart a considerable degree of crease-recovery to the fabric as well as dimensional stability. Furthermore, this effect remains through repeated launderings.

A considerable advantage of my invention lies in the fact that fabric treated with my composition does not retain chlorine after immersion in a chlorine bleach. Thus, hydrochloric acid is not released upon ironing. In the case of urea-formaldehyde, melamine-formaldehyde and dimethylol ethylene-urea types of crease-proofing treatment chlorine is retained. When hydrochloric acid is released by pressing or ironing, considerable tendering of the fabric occurs.

The polymer formed in the fabric upon proper cure is assumed to be a polyacetal. Read (J. Chem. Soc., 101, pp. 2090–4 (1912)) and Kropa and Thomas (U. S. 2,643,236) had shown that under appropriate conditions glyoxal and pentaerythritol would condense to form a water insoluble and infusible polymer. Orth (Kunststoffe, 41, pp. 454–7 (1951)) described a polyacetal prepared by condensation of terephthalaldehyde and a simple pentaerythritol derivative to form compositions useful in molding compounds.

I have found that glyoxal and pentaerythritol condense to form polyacetals that are water insoluble only under conditions so rigorously acidic as to preclude use in textile processing. I have found that succinaldehyde, glutaraldehyde and other dialdehydes which are water soluble condense fairly readily under mildly acidic catalysis to yield durable crease-proofing in fabrics treated with them. On the other hand, fabrics treated with glyoxal-pentaerythritol combinations, wash out readily and lose any crease recovery effect. Attempts have also been made to obtain crease recovery by use of malonaldehyde or derivatives thereof with pentaerythritol or its derivatives in fabric treatment. However, no enchancement of crease recovery in fabric occurred in any of these applications wherein malonaldehyde was employed.

Generally, the reaction is believed to follow the course given below:

OHC—(CH₂)ₙ—CHO +  HO—CH₂  CH₂—OH
                          \   /
                           C          catalyst
                          /   \         →
                     HO—CH₂  CH₂—OH O—CH₂  CH₂—O                    O—CH₂  CH₂—
                 \   /      \                    \   /      \
         HC—(CH₂)ₙ—CH        C          CH—(CH₂)ₙ—CH        C
              /              /  \                 /             /  \
             O—CH₂  CH₂—O                        O—CH₂  CH₂— when $n=2$ or more with the spirane ring alternating with the (CH₂)ₙ— chain to form a linear polymer. The spirane ring is a rigid structure and such a linear polymer has ample possibility for hydrogen-bonding. Therefore the polymer itself may be high melting and relatively insoluble in water and in solvents of low polarity, such as hydrocarbons, simple esters, simple ketones, chlorinated solvents and other products normally used in drycleaning.

Although many dialdehydes will yield such condensation products, the compounds used practically in textile application are limited to those which are capable of being applied in aqueous solution or emulsion. Similarly simple precursors and derivatives capable of generating such dialdehydes may be employed. Suitable precursors include oxygen-containing heterocyclic compounds from which dialdehydes may be obtained, such as various tetrahydro furanes and dihydro pyranes. Suitable derivatives include hemiacetals, acetals, bisulfite addition products, oximes, hydrazones, and the like.

In most cases the simple derivatives of the dialdehydes, such as the tetramethylacetal, are more insoluble than the aldehydes from which they are derived. However, they may be applied from emulsion (along with the co-reactants) and during processing will hydrolyze to yield the more readily water-soluble dialdehyde.

Aside from the practical aspect of the use of aqueous solutions in normal textile processing there is the additional requirement of penetration of the chemical into the fiber. In aqueous baths cellulosic fibers are known to show considerable swelling and, it is believed, to undergo considerable increase in pore size. Thus, aqueous application facilitates entrance of reactants into the fiber. In subsequent polymerization a polymer is formed in situ thus giving rise to the phenomenon known as crease-proofing.

Dialdehydes with longer carbon chains than adipaldehyde ($n=4$ in the figure above) are difficultly soluble in water, or of such limited solubility as to be of little value in the application described. Of course, side groups such as hydroxyls on the methylenic carbons may induce greater solubility in water.

From the foregoing description it should be clear that succinaldehyde, glutaraldehyde, and hydroxy-adipaldehyde are preferred in my invention. Water-soluble dialdehydes of similar chain length with substituents on the carbon atoms are also of value. Such substituents may include

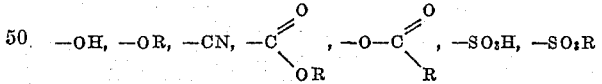

and the like, when R is an alkyl radical possessing not more than seven carbon atoms. Naturally, mixtures of dialdehydes are also useful.

Pentaerythritol has been mentioned as the prime reactant. However, dipentaerythritol, tripentaerythritol, and higher ethers may enter into these reactions. In these cases, the condensation products are not linear, but may be three dimensional or space polymers. Since the pentaerythritol ethers (polypentaerythritols) have limited water solubility, several simple derivatives of these compounds are of value in order to increase water-solubility. In some circumstances such derivatives even of pentaerythritol are of considerable value in order to increase solubility, or even stabilize mixtures of these with dialdehydes. Simple formic esters of pentaerythritol, dipentaerythritol and higher ethers show greater water-solubility than the polyol and are stable enough in aqueous solutions to be of value in application to fabric. Even greater stability is shown by mono- or polyformals or acetals of pentaerythritol and dipentaerythritol. Likewise, the isopropylidene ketals of pentaerythritol may be employed. These are prepared by heating the pentaerythritol with either formaldehyde or acetaldehyde or their polymers or with acetone in presence of acidic catalyst. Upon hydrolysis these compounds yield pentaerythritol or a polypentaerythritol capable of reacting with the dialdehydes. In addition, when proper conditions of heat and catalyst are applied, an aldehyde interchange will take place and the appropriate condensation polymer will form as follows:

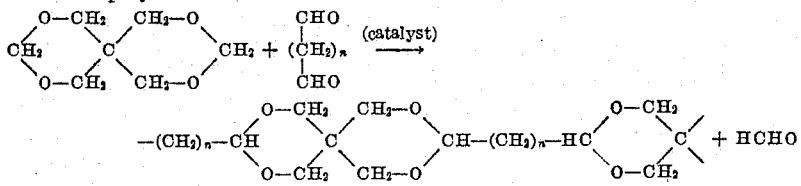

In the case of the formic (or other esters) the free acid is formed and may escape by volatilization.

Other catalysts have also been useful in acetal preparation and are applicable in my invention. These include metal halides such as $AlCl_3$, $ZnCl_2$, $FeCl_3$, dehydrating agents such as $P_2O_5$, and acid salts such as $NH_4Cl$. Other similar materials will effect the condensation.

Conditions of time and temperature of cure are significant in obtaining optimum results. Thus under certain conditions, condensation may take place at about 75° F. However, for practical application, cure temperatures of 280–320° F. at times of 2–8 minutes may be used to effect the condensation in fabric. These are described in greater detail in the examples below.

In order to clarify the preceding description, the examples are described.

The following indicates the procedure used in applying the crease-proofing compositions to cellulose fabrics:

Example I

The following aqueous solution was prepared, the amounts given by weight.

| | Percent |
|---|---|
| 2-hydroxyadipaldehyde | 4.5 |
| Commercial pentaerythritol | 4.5 |
| Oxalic acid | 1.0 |

Rayon gabardine was padded with the above solution using two nips. The wet pick-up was 100%. The fabric was placed on a frame with slight tension and dried at 180° F. The dried fabric was cured in a circulating hot air oven at 315° F. for 5 minutes. After cure, the fabric was hand washed and tested. The sum of warp and fill angles was 250°. Untreated gabardine showed a sum of 195°. Crease recovery was determined by the procedure listed in the Technical Manual of the American Association of Textile Chemists and Colorists, 1953, page 165, Tentative Test Method 66–53.

Example II

Cotton sheeting (80 square) was padded as in Example I with an aqueous solution containing by weight:

| | Percent |
|---|---|
| Glutaraldehyde | 3.0 |
| Dipentaerythritol diformal | 4.5 |
| Oxalic acid | 0.5 |

The fabric was dried on a frame with tension at 160° F. and cured in a convection oven at 300° F. for 4 minutes. The sum of warp and fill angles after hand rinsing the sheeting in soap solution and pressing was 241°. Untreated cotton sheeting showed a reading of 175°. The cotton had a full resilient hand.

The following example indicates the lack of persistence of the glyoxal-pentaerythritol composition. Rayon gabardine was treated as described in Example I. The wash test used was the A. A. T. C. C. 1953 Standard Test Method 14–52 at 212° F. The chlorine retention test was the A. A. T. C. C. Tentative Test 69–52.

Example III

| Percent Dialdehyde | Percent Pentaerythritol | Percent Catalyst | Crease resistance, Monsanto [1] | | | Chlorine Retention |
|---|---|---|---|---|---|---|
| | | | Handwash | 1 W. | 2 W. | |
| Glyoxal, 2.0 | 4.5 | Oxalic, 1.5 | 246 | 186 | | nil. |
| Malonaldehyde, 2.3 | 4.5 | do | 197 | 181 | | nil. |
| Succinaldehyde, 2.6 | 4.5 | do | 260 | 250 | 242 | nil. |
| Glutaraldehyde, 3.0 | 4.5 | do | 252 | 246 | 238 | nil. |
| Hydroxyadipaldehyde, 4.0 | 4.5 | do | 228 | | 224 | nil. |
| Methyl glutaraldehyde, 3.5 | 4.5 | do | 233 | 230 | | nil. |
| $H_2O$ Treatment | | | 191 | 186 | | nil. |

[1] Sum of warp and fill recovery angles.

The dialdehyde glyoxal yielded no retention of crease resistance even in conjunction with dipentaerythritol and tripentaerythritol. This is shown by the following example wherein rayon gabardine was treated in the same manner as described in Example I. 1.5% oxalic acid was used as catalyst.

Example IV

| Percent Glyoxal | Pentaerythritol Ether | Crease Recovery, Warp and Fill Degrees | |
|---|---|---|---|
| | | Hand Wash | 1 Wash |
| 2.0 | Dipentaerythritol 3.0 | 238 | 203 |
| 2.5 | Tripentaerythritol 2.5 | 221 | 181 |
| $H_2O$ Treated Piece | | 198 | 186 |

The utility of esters of pentaerythritol is shown in the following example. All were catalyzed with a zinc chloride diglycolic acid composition (1:4 by weight) and treated as in Example I.

Example V

| Fabric | Glutar-aldehyde | Pentae-rythritol formate | Percent Catalyst | Crease Recovery, 212° Wash Sum of Warp and Fill |
|---|---|---|---|---|
| | | | | Degrees |
| Rayon Gabardine | 4.0 | 4.0 | 2.5 | 225 |
| Do | | | | 199 |
| Rayon Challis | 4.0 | 4.0 | 2.5 | 245 |
| Do | | | | 197 |
| Cotton Sheeting, 80 sq | 4.0 | 4.0 | 1.0 | 258 |
| Do | | | | 190 |

In order to be useful in commercial application, it is desirable to stabilize the compositions described above so that they do not prematurely condense to form resin, either in the padding bath or to coat the fiber, thus lessening crease recovery. As an example, the following experiment is illustrative of the stabilization requirements.

Example VI

Equal weights of glutaraldehyde and pentaerythritol (commercial) were dissolved in water so that a 30% concentration of solids were present. To 50 ml. of this solution various modifiers were added. Adjustments in acidity were made with aqueous sodium acetate solution.

| Modifier | pH | Results |
|---|---|---|
| None | 3–4 | Precipitates—5–10 minutes. |
| Methanol 5 ml | 3–4 | Precipitates—4 hours. |
| Formalin 5 ml | 3–4 | Precipitates—2 hours. |
| | 5–6 | Clear solution—312 hours. |

It is understood that mixtures of dialdehydes (and/or derivatives) and pentaerythritol, pentaerythritol ethers and derivatives may be used in the processing described herein. It is also possible to use hemiacetals of either type of component and hemiacetals of both reactants. Hemiacetals are formed to some extent merely upon mixing the components in solution. Although there are no theoretical limits to application, practical aspects indicate the importance of setting these limits. A composition which is too low in the component parts will not increase crease recovery. Conversely, too high a composition percentage in a treatment bath will be uneconomical or else cause such a large crease recovery as to make ordinary sewing and manufacturing operations on such treated fabric difficult.

As an example of quantities useful in this application, the following experiments were carried out.

Example VII

Rayon gabardine treated as in Example I.

| Percent Solids Glutaraldehyde-Di-pentaerythritol Formal | Percent Catalyst Zinc Chloride Diglycolic Acid 1:4 | Degrees Monsanto Warp and Fill After Std. 212° F. Wash |
|---|---|---|
| 0 | | 201 |
| 1.5 | 3.0 | 202 |
| 3.0 | 3.0 | 220 |
| 7.0 | 3.0 | 256 |
| 15.0 | 3.0 | 304 |
| 20.0 | 3.0 | 318 |

Thus, lower concentrations yield little effect and the law of diminishing returns applies at the higher concentration. Effective limits of the treating bath may thus be chosen between 0.5 and 30% of solids. The preferred limits are 3–20% of solids. If desired, I may prepare the treating compositions in concentrated form containing for example as much as 50% solids which can be suitably diluted prior to application.

As an additional desirable property, fabrics treated as described above show dimensional control when tested according to the A. A. T. C. C. wash test at 212° F. as shown in the following example:

Example VIII

Rayon gabardine was treated as in Examples I and III.

| Treatment | Warp Shrinkage, percent | |
|---|---|---|
| | 1 Wash | 5 Washes |
| Pentaerythritol-Hydroxyadipaldehyde | 2.5 | 2.2 |
| Succinaldehyde-Pentaerythritol | 0.7 | 2.2 |
| None | 9.0 | 11.0 |

Cotton sheeting, treated as described above, showed the following:

| Treatment | Warp Shrinkage, percent | |
|---|---|---|
| | 1 Wash | 5 Washes |
| Glutaraldehyde dipentaerythritol | 0.9 | 1.10 |
| None | 5.3 | 5.7 |

It is understood that mixtures of dialdehydes (and/or pentaerythritol derivatives) and pentaerythritol, pentaerythritol ethers and derivatives may be used in the processing described herein. It is also possible to use hemiacetals of both types of components and hemiacetals of both reactants. It is highly probable that these are formed to some extent merely upon mixing in solution.

The products herein described are also useful in the treatment of paper, regenerated cellulose films, leather, zein, and other proteins.

Because of the high melting point of the polymers formed by the reaction, and the possibility of a crystalline structure, it is possible that these polymers may find use as synthetic fibers. In addition, their use either alone or with other components in molding compositions, so-called hot melts, potting compounds, and casting resins, is indicated. In suitable solvent these products may form useful protective coatings in electrical insulation, alkali-resistant coatings, and in solvent resistant coatings. Needless to say these coatings may be of value for decorative purposes and in printing compositions.

The compositions may be used in textile application along with starches, dextrines, vinyl resins, urea and melamine formaldehyde resins, phenolic resins, and alkyd resins, and the like for imparting hand in textiles and in other modifications such as water repellency, fire retardancy and similar treatments. The composition may be used advantageously along with dimensional control agents. Such use may be advantageous in that improvement in tensile strength is observed along with the crease resistance. The compositions described above may also be used in treatment of so-called non-woven fabrics.

By textile application is meant application to textile materials. These may be described as filaments and fibers, staple or yarns, whether in finished stages or at some intermediate stage in the production thereof, of the group consisting of natural cellulose, regenerated cellulose and mixtures thereof with other natural and synthetic fibers such as cellulose acetate, nylon, wool, etc. The term also includes fabrics, whether knitted, woven or felted, as well as garments or other articles made from such fabrics.

I claim:

1. The process of modifying a textile material which comprises treating said textile material with an aqueous medium containing a dialdehyde possessing from 2 to 4 methylene groups and a pentaerythritol, and heating the treated material under acidic conditions.

2. The process of modifying a textile material which comprises treating said textile material with an aqueous medium containing a compound capable of generating a dialdehyde possessing from 2 to 4 methylene groups and a pentaerythritol, and heating the treated material under acidic conditions.

3. The process of modifying a textile material which comprises treating said textile material with an aqueous medium containing a dialdehyde possessing from 2 to 4 methylene groups and a hydrolyzable compound yielding a pentaerythritol, and heating the treated material under acidic conditions.

4. The process of modifying a textile material which comprises treating said textile material with an aqueous medium containing a compound capable of generating a dialdehyde possessing from 2 to 4 methylene groups and a hydrolyzable compound yielding a pentaerythritol, and heating the treated material under acidic conditions.

5. The process of imparting durable crease-recovery to a textile material which comprises treating said material with an aqueous medium containing a dialdehyde-generating compound possessing from 2 to 4 methylene groups and a pentaerythritol polyformal under acidic conditions.

6. The process of imparting durable crease-recovery to a textile material which comprises treating said textile material with an aqueous medium containing a dialdehyde possessing from 2 to 4 methylene groups and a pentaerythritol formate, and heating the treated material under acidic conditions.

7. The process of imparting durable crease-recovery to a textile material which comprises treating said material with an aqueous medium containing a dialdehyde possessing from 2 to 4 methylene groups and a pentaerythritol polyformal under acidic conditions.

8. The process of imparting durable crease-recovery to a textile material which comprises treating said textile material with an aqueous medium containing a dialdehyde-generating compound possessing from 2 to 4 methylene groups and pentaerythritol formate, and heating the treated material under acidic conditions.

9. The process of imparting crease-recovery to a textile material which comprises treating said textile material with an aqueous bath containing glutaraldehyde and a compound selected from the group consisting of pentaerythritol, dipentaerythritol and tripentaerythritol, and heating the treated material under acidic conditions.

10. The process of imparting crease-recovery to a textile material which comprises treating said textile material with an aqueous bath containing glutaraldehyde and a pentaerythritol diformal and heating the treated material under acidic conditions.

11. The process of imparting crease-recovery to a textile material which comprises treating said textile material with an aqueous bath containing a hydroxyadipaldehyde and a compound selected from the group consisting of pentaerythritol, dipentaerythritol and tripentaerythritol, and heating the treated material under acidic conditions.

12. The process of imparting durable crease-recovery to a textile material which comprises treating said textile material with an aqueous medium containing a compound selected from the group consisting of succinaldehyde, glutaraldehyde, hydroxyadipaldehyde, and methyl glutaraldehyde and a hydrolyzable compound yielding a pentaerythritol, and heating the treated material under acidic conditions.

13. The process of imparting durable crease-recovery to a textile material which comprises treating said textile material with an aqueous medium containing a compound selected from the group consisting of succinaldehyde, glutaraldehyde, hydroxyadipaldehyde, and methyl glutaraldehyde and a pentaerythritol, and heating the treated material under acidic conditions.

14. The process of imparting durable crease-recovery to a textile material which comprises treating said material with an aqueous medium containing a dialdehyde possessing from 2 to 4 methylene groups wherein at least one hydrogen is replaced by a radical selected from the group consisting of

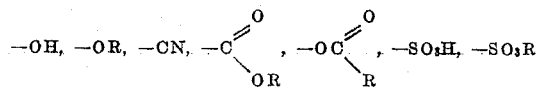

where R is an alkyl group containing not more than 7 carbon atoms, and a pentaerythritol, and heating the treated material under acidic conditions.

15. The process of imparting durable crease-recovery to a textile material which comprises treating said material with an aqueous medium containing a dialdehyde possessing from 2 to 4 methylene groups wherein at least one hydrogen is replaced by a radical selected from the group consisting of

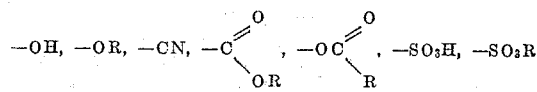

where R is an alkyl group containing not more than 7 carbon atoms, and a hydrolyzable compound yielding a pentaerythritol, and heating the treated material under acidic conditions.

16. An aqueous textile treating bath containing a dialdehyde possessing from 2 to 4 methylene groups and a pentaerythritol.

17. An aqueous textile treating bath containing a compound capable of generating a dialdehyde possessing from 2 to 4 methylene groups and a pentaerythritol.

18. An aqueous textile treating bath containing a dialdehyde possessing from 2 to 4 methylene groups and a hydrolyzable compound yielding a pentaerythritol.

19. An aqueous textile treating bath containing a compound generating a dialdehyde possessing from 2 to 4 methylene groups and a hydrolyzable compound yielding a pentaerythritol.

20. An aqueous textile treating bath containing a dialdehyde generating compound possessing from 2 to 4 methylene groups and a pentaerythritol polyformal.

21. An aqueous textile treating bath containing a dialdehyde possessing from 2 to 4 methylene groups and a pentaerythritol formate.

22. An aqueous textile treating bath containing a dialdehyde possessing from 2 to 4 methylene groups and a pentaerythritol polyformal.

23. An aqueous textile treating bath containing a dialdehyde generating compound possessing from 2 to 4 methylene groups and a pentaerythritol formate.

24. An aqueous textile treating bath containing glutaraldehyde and a compound selected from the group consisting of pentaerythritol, dipentaerythritol and tripentaerythritol.

25. An aqueous textile treating bath containing glutaraldehyde and a pentaerythritol diformal.

26. An aqueous textile treating bath containing a hydroxyadipaldehyde and a compound selected from the group consisting of pentaerythritol, dipentaerythritol and tripentaerythritol.

27. An aqueous textile treating bath containing a compound selected from the group consisting of succinaldehyde, glutaraldehyde, hydroxyadipaldehyde, and methyl glutaraldehyde and a hydrolyzable compound yielding a pentaerythritol.

28. An aqueous textile treating bath containing a compound selected from the group consisting of succinaldehyde, glutaraldehyde, hydroxyadipaldehyde, and methyl glutaraldehyde, and a pentaerythritol.

29. An aqueous textile treating bath containing a dialdehyde possessing from 2 to 4 methylene groups wherein at least one hydrogen is replaced by a radical selected from the group consisting of

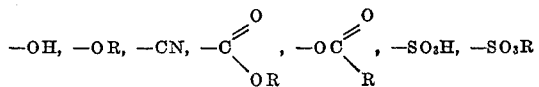

where R is an alkyl group containing not more than 7 carbon atoms and a pentaerythritol.

30. An aqueous textile treating bath containing a dialdehyde possessing from 2 to 4 methylene groups wherein at least one hydrogen is replaced by a radical selected from the group consisting of

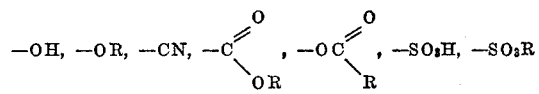

where R is an alkyl group containing not more than 7 carbon atoms and a hydrolyzable compound yielding a pentaerythritol.

31. The process of modifying a textile material which comprises treating said textile material with an aqueous medium containing a condensation product of a dialdehyde containing from 4 to 6 carbon atoms in a straight chain and a pentaerythritol.

32. A textile material impregnated with a condensation product of a dialdehyde containing 4 to 6 carbon atoms in a straight chain and a pentaerythritol.

References Cited in the file of this patent

UNITED STATES PATENTS

| | | |
|---|---|---|
| 2,389,662 | Fisher | Nov. 27, 1945 |
| 2,436,076 | Pfeffer | Feb. 17, 1948 |
| 2,643,236 | Kropa | June 23, 1953 |
| 2,739,972 | Abbott | Mar. 27, 1956 |

FOREIGN PATENTS

| | | |
|---|---|---|
| 317,085 | Great Britain | Dec. 8, 1930 |
| 842,075 | Germany | June 23, 1952 |
| 838,827 | Germany | Aug. 12, 1952 |
| 522,578 | Canada | Mar. 3, 1956 |